US008072619B2

(12) United States Patent
Fujii et al.

(10) Patent No.: US 8,072,619 B2
(45) Date of Patent: Dec. 6, 2011

(54) PRINTING APPARATUS AND METHOD FOR CONTROLLING THE SAME

(75) Inventors: Shuhji Fujii, Kyoto (JP); Nobuyuki Ueda, Nara (JP); Atsuhiko Murakami, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 910 days.

(21) Appl. No.: 12/082,314

(22) Filed: Apr. 9, 2008

(65) Prior Publication Data

US 2008/0246977 A1 Oct. 9, 2008

(30) Foreign Application Priority Data

Apr. 9, 2007 (JP) ................................ 2007-101832

(51) Int. Cl.
*G06K 15/00* (2006.01)
*G06F 3/12* (2006.01)

(52) U.S. Cl. ..................................... 358/1.12; 358/1.15

(58) Field of Classification Search ........................ None
See application file for complete search history.

(56) References Cited

U.S. PATENT DOCUMENTS

2002/0131787 A1* 9/2002 Shimizu et al. ................. 399/82
2003/0025937 A1* 2/2003 Christodoulou et al. ..... 358/1.15
2008/0180711 A1* 7/2008 Ebuchi ......................... 358/1.12

FOREIGN PATENT DOCUMENTS

| | | | |
|---|---|---|---|
| JP | 06-156804 | | 6/1994 |
| JP | 08-282030 | | 10/1996 |
| JP | 10-031394 | | 2/1998 |
| JP | 11-301079 | | 11/1999 |
| JP | 2000-330741 | A | 11/2000 |
| JP | 2001-213031 | | 8/2001 |
| JP | 2001-315997 | A | 11/2001 |
| JP | 2004-338834 | | 12/2004 |

* cited by examiner

*Primary Examiner* — Dov Popovici

(74) *Attorney, Agent, or Firm* — Edwards Wildman Palmer LLP; David G. Conlin; David A. Tucker

(57) ABSTRACT

According to one embodiment of the present invention, a printing apparatus including a printing unit for executing a print job and performing a printing process on recording paper, and a control unit for controlling the printing unit, the printing apparatus causing the printing unit to execute a plurality of print jobs sequentially, wherein the printing apparatus further includes a recording paper detection unit for detecting a size of recording paper fed to the printing unit, and when a size of recording paper detected by the recording paper detection unit is different from a size of recording paper set by a print job that is being executed by the printing means, the control unit performs control such that a period of time until the recording paper is discharged is shortened to the minimum.

12 Claims, 7 Drawing Sheets

FIG.5

| | Number of switchable positions | Switch position Conveyance path | Switch position Conveyance path | Switch position Conveyance path | Note |
|---|---|---|---|---|---|
| Branch claw 45A | Switchable between two positions | Pa1 Conveyance path 43 | Pa2 Conveyance path 71 | — | Moved by solenoid, etc. |
| Branch claw 45B | Movable | — | — | — | Moved by spring and stiffness of paper |
| Branch claw 45C | Switchable between three positions | Pc1 Conveyance path 44a | Pc2 Conveyance path 72 | Pc3 Conveyance path 73 | Moved by solenoid, etc. |
| Branch claw 45D | Switchable between two positions | Pd1 Conveyance path 44a | Pd2 Conveyance path 72 | — | Moved by solenoid, etc. |
| Branch claw 45E | Position fixed | — | — | — | — |

PRINTING APPARATUS AND METHOD FOR CONTROLLING THE SAME

This application claims priority under 35 U.S.C. §119(a) on Patent Application No. 2007-101832 filed in Japan on Apr. 9, 2007, the entire contents of which are hereby incorporated herein.

BACKGROUND OF THE INVENTION

The present invention relates to a printing apparatus that prints recording paper by an electrophotographic image forming method or the like, and a method for controlling the printing apparatus.

Some of this type of printing apparatus have sped up the printing process, so a plurality of print jobs can be executed one after another.

In order to maintain such a high speed printing process, it is necessary to continuously execute a plurality of jobs without interruption. To this end, for example, the technique disclosed in JP 2000-330741A increases the duration for which a printing operation can be carried out continuously by omitting the initialization operation of the apparatus that is performed after each job, and performing print data management on a per job basis with a configuration in which jobs and print data are managed separately by a job management unit and a print data management unit, respectively, and a printing operation is continued if both a job to be printed and the print data are present during the printing operation, and an instruction to stop the printing operation is outputted only if it is necessary to perform an initialization operation after a stop request is made or a printer parameter is changed.

A printing apparatus usually has a plurality of paper feed cassettes, so recording papers of given sizes can be placed and loaded in the paper feed cassettes. When recording paper is placed and loaded in a paper feed cassette, the size of the recording paper loaded in the paper feed cassette is inputted/instructed. And, when executing a print job, the paper feed cassette that contains the recording paper of the size set by this print job is selected, and the recording paper is drawn from this paper feed cassette to feed the paper.

However, if a wrong size is inputted/instructed when inputting/instructing the size of the recording paper that has been loaded in the paper feed cassette, then, even if the paper feed cassette is selected according to the size set by the print job, the paper feed cassette feeds recording paper having a size different from that set by the print job, resulting in defective printouts.

Also, if the size of recording paper is different from that set by a print job, the timing of conveying the recording paper is shifted for example, and a conveyance failure or jam of recording paper is likely to occur. If such an event occurs, the print job stops immediately, and the print job cannot be restored for a long time until that event is resolved. Particularly when a plurality of print jobs are queued, the printing of all the print jobs is delayed, and it is therefore impossible to achieve a high speed printing process.

Alternatively, it is also possible to conceive a configuration in which the size of the recording paper fed from a paper feed cassette is detected, and a printing process is stopped immediately when the detected size of the recording paper is different from the size set by the print job. However, in this case also, the print jobs are stopped, and the printing of all the print jobs is delayed.

Further, even if the technique disclosed in JP 2000-330741A can omit the initialization operation that is performed before each job, it cannot solve the stopping of print jobs caused by such a mismatch in the recording paper size.

SUMMARY OF THE INVENTION

Under the circumstances, the present invention has been conceived to solve the problems encountered with conventional techniques described above, and it is an object of the present invention to provide a printing apparatus in which print jobs are continued without interruption even if recording paper having a size different from that set by the print job is fed, and a method for controlling the printing apparatus.

In order to solve the above problems, a printing apparatus of the present invention includes a printing means for executing a print job and performing a printing process on recording paper, and a control means for controlling the printing means, the printing apparatus causing the printing means to execute a plurality of print jobs sequentially, wherein the printing apparatus further comprises a recording paper detection means for detecting a size of recording paper fed to the printing means, and when a size of recording paper detected by the recording paper detection means is different from a size of recording paper set by a print job that is being executed by the printing means, the control means performs control such that a period of time until the recording paper is discharged is shortened to the minimum.

The printing means outputs a signal that indicates completion of the print job after the recording paper is discharged, and in response thereto receives and executes a next print job.

When a length of recording paper detected by the recording paper detection means is longer than a length of recording paper set by a print job that is being executed by the printing means, the control means delays a timing of feeding the next recording paper to the printing means.

When a length of recording paper detected by the recording paper detection means is longer than a length of recording paper set by a print job that is being executed by the printing means, the control means starts feeding the next recording paper to the printing means after a trailing edge of recording paper is detected by the recording paper detection means.

When a size of recording paper detected by the recording paper detection means is different from a size of recording paper set by a print job that is being executed by the printing means, the control means prohibits a double-sided printing process on the recording paper and causes the printing means to perform a single-sided printing process.

When a size of recording paper detected by the recording paper detection means is different from a size of recording paper set by a print job that is being executed by the printing means, the control means prohibits an operation of turning over the recording paper performed by the printing means.

Recording paper that is being conveyed along a conveyance path from a position of feeding recording paper to the recording paper detection means is discharged in the shortest time.

Recording paper that is being conveyed along a conveyance path from a position of feeding recording paper to the recording paper detection means is discharged in the shortest time, and is not subjected to print processing.

The number of sheets of recording paper that are discharged in the shortest time is set according to a conveying distance from a position where recording paper is fed to the recording paper detection means.

The control means issues a message that the period of time until the recording paper is discharged is shortened to the minimum.

Meanwhile, a method for controlling a printing apparatus that includes a printing means for executing a print job and performing a printing process on recording paper, and that causes the printing means to execute a plurality of print jobs sequentially, the method including the steps of: detecting a size of recording paper fed to the printing means; and when the detected size of recording paper is different from a size of recording paper set by a print job that is being executed by the printing means, performing control such that a period of time until the recording paper is discharged is shortened to the minimum.

The printing means outputs a signal that indicates completion of the print job after the recording paper is discharged, and in response thereto receives and executes a next print job.

According to the present invention described above, a configuration is adopted in which when the size of recording paper detected by the recording paper detection means is different from the size of recording paper set by a print job that is being executed by the printing means, control is performed such that a period of time until the recording paper is discharged is shortened to the minimum. For example, if a wrong size is inputted/instructed for the recording paper loaded in a paper feed cassette, an event occurs that the size of the recording paper fed from the paper feed cassette differs from the size of recording paper set by a print job. When such an event occurs, the period of time until the recording paper is discharged is shortened to the minimum. For example, the conveyance path of the recording paper is shortened to the minimum. This makes it unlikely for a conveyance failure or jam of recording paper to occur, preventing the stopping of print jobs resulting from these causes, and allowing a plurality of print jobs to be processed continuously. Accordingly, a continuous high speed printing process can be maintained.

Further, a configuration is adopted in which a signal that indicates completion of the print job is outputted from the printing means after the recording paper is discharged, and in response thereto, the printing means receives and executes the next print job. With this configuration, the printing process of the next recording paper is started after the preceding recording paper has finished passing, which makes sure that the preceding and subsequent recording papers are spaced apart, and do not overlap each other, even when the length of recording paper is longer than the size of recording paper set by a print job.

For example, when the length of the actual recording paper is longer than the size of recording paper set by a print job, even if printing of an amount equal to the length set by the print job is completed, at this time, the trailing edge of the actual recording paper has not been discharged from the printing means. If the printing process of the next recording paper is started at this time, the trailing edge of the preceding recording paper and the leading edge of the subsequent recording paper contact or overlap, which causes a conveyance failure or jam of recording paper. To address this, a configuration is adopted in which the printing process of the subsequent recording paper is started after the preceding recording paper has finished passing.

Also, a configuration is adopted in which when the length of recording paper detected by the recording detection means is longer than the size of recording paper set by a print job that is being executed by the printing means, the timing of feeding the next recording paper to the printing means is delayed, or feeding of the next recording paper to the printing means is started after the trailing edge of the preceding recording paper is detected. This configuration also makes sure that the preceding and subsequent recording papers are spaced apart, and do not overlap each other.

Also, a configuration is adopted in which when the size of recording paper detected by the recording detection means is different from the size of recording paper set by a print job that is being executed by the printing means, a double-sided printing process on the recording paper is prohibited, and a single-sided printing process is performed by the printing means, or the operation of reversing the surface of the recording paper performed by the printing means is prohibited. With this configuration, the period of time until the recording paper is discharged, and the conveyance path of the recording paper are shortened to the minimum, which makes it unlikely for a conveyance failure or jam of recording paper to occur.

When the conveying distance from a position of feeding recording paper to the recording paper detection means is long, several papers having been drawn continuously from a paper feed cassette are present in that long conveying distance. The recording papers that are being conveyed, even if they have the same size as the preceding recording paper that is being printed, have a size different from the size of recording paper set by the print job. For this reason, those that are being conveyed also need to be discharged in the shortest time. It is unnecessary to perform a printing process.

The number of recording paper that is being conveyed increases as the conveying distance from a position of feeding recording paper to the recording paper detection means increases, and thus the number is set according to the conveying distance.

Further, the fact that control has been made such that the period of time until the recording paper is discharged is shortened to the minimum is notified. The user can perform an appropriate process based on this notification such as discarding of the recording paper discharged in the shortest time.

With the method for controlling a printing apparatus of the present invention, functions and effects similar to those of the above-described printing apparatus of the present invention can be obtained.

BRIEF DESCRIPTION OF THE DRAWINGS

FIG. 5 is a table to illustrate differences in the discharge operation of recording paper by switching of branch claws of FIG. 4 in an organized manner.

DETAILED DESCRIPTION OF PREFERRED EXAMPLES

Hereinafter, an embodiment of the present invention will be described in detail with reference to the accompanying drawings.

Figure 1:
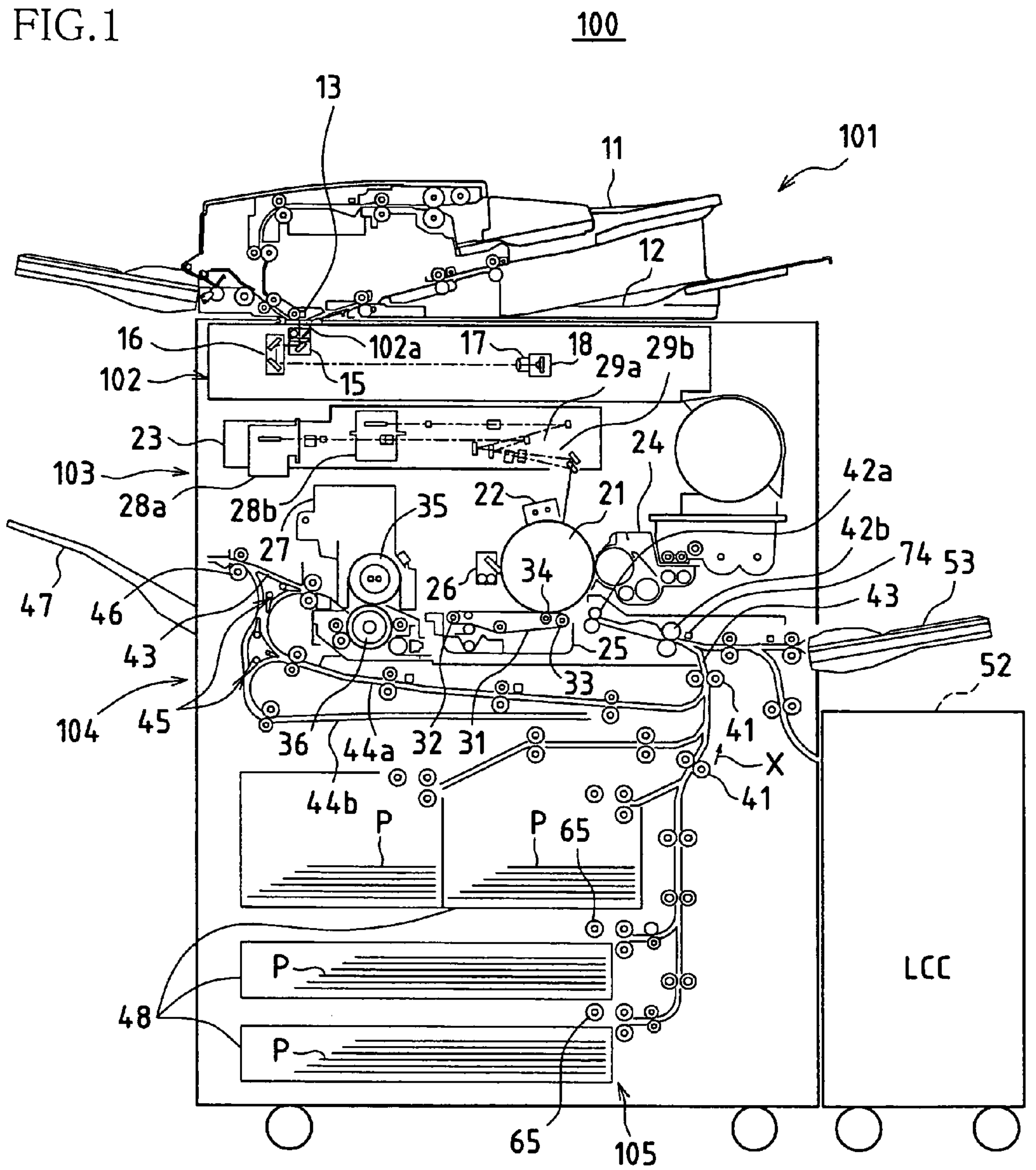
FIG. 1 is a cross-sectional view that shows a printing apparatus according to one embodiment of the present invention.

FIG. 1 is a cross-sectional view that shows a printing apparatus according to one embodiment of the present invention. The printing apparatus 100 is a digital multifunctional peripheral (MFP) that selectively executes a copy mode, a print mode, a scan mode and a fax mode, and acquires image data read out from an original document or image data received from an external device, and forms the monochrome image represented by the image data on recording paper. This printing apparatus 100 is configured mainly of a document conveying unit (ADF) 101, an image reading unit 102, a print processing unit 103, a recording paper conveying unit 104, and a feeding unit 105.

After at least one original document is placed in an document set tray 11, the document conveying unit 101 conveys the original documents sheet by sheet from the document set tray 11 through a document reading window 102*a* of an image reading unit 102, and discharges them to a discharge tray 12.

On the document reading window 102*a*, a CIS (contact image sensor) 13 is provided. The CIS 13 repeatedly reads the image on the back of an original document in the main scanning direction while the original document passes through the document reading window 102*a*, and outputs image data representing the image on the back of the original document.

While the original document passes through the document reading window 102*a*, the image reading unit 102 exposes the surface of the original document with a lamp of a first scanning unit 15, light reflected at the surface of the original document is guided to an imaging lens 17 by mirrors of first and second scanning units 15 and 16, and the image on the surface of the original document is imaged on a CCD (charge coupled device) 18 by the imaging lens 17. The CCD 18 repeatedly reads the image on the surface of the original document in the main scanning direction, and outputs image data representing the image on the surface of the original document.

Further, when an original document is placed on the glass platen above the upper surface of the image reading unit 102, the first and second scanning units 15 and 16 are moved while maintaining a predetermined speed relationship between them, the surface of the original document on the glass platen is exposed by the first scanning unit 15, light reflected at the surface of the original document is guided to the imaging lens 17 by the first and second scanning units 15 and 16, and the image on the original document surface is imaged on the CCD 18 by the imaging lens 17.

The image data outputted from the CIS 13 or the CCD 18 is subjected to various kinds of image processing by a control circuit such as a microcomputer, and then is outputted to the print processing unit 103.

The print processing unit 103 is a unit that records the original represented by the image data on recording paper, and includes a photosensitive drum 21, a charging unit 22, an optical write unit 23, a developing unit 24, a transfer unit 25, a cleaning unit 26, a fixing apparatus 27, and the like.

The photosensitive drum 21 is an organic photoreceptor having a surface layer made of an organic photoconductive material. As is rotated in one direction, the surface is cleaned by the cleaning unit 26, after which the surface is uniformly charged by the charging unit 22. The charging unit 22 may be a charger type, or a roller type or brush type that contacts the photosensitive drum 21.

The optical write unit 23 is a laser scanning unit (LSU) that includes two laser irradiation units 28*a* and 28*b*, and two mirror groups 29*a* and 29*b*. When the optical write unit 23 receives an input of the image data, laser light based on the image data is emitted from the laser irradiation units 28*a* and 28*b* through the mirror groups 29*a* and 29*b*, respectively, to the photosensitive drum 21 to expose the uniformly charged surface of the photosensitive drum 21 and form an electrostatic latent image on the surface of the photosensitive drum 21.

The optical write unit 23 is a two-beam writing unit that includes two laser irradiation units 28*a* and 28*b* so as to cope with a high speed printing process, and reduces the burden caused by increasing the speed of the irradiation timing.

As the optical write unit 23, it is also possible to use, instead of the laser scanning unit, an EL writing head or LED writing head in which light-emitting elements are arranged in an array.

The developing unit 24 supplies toner to the surface of the photosensitive drum 21, develops the electrostatic latent image, and forms a toner image (also called a visible image) on the surface of the photosensitive drum 21. The transfer unit 25 transfers the toner image on the surface of the photosensitive drum 21 to the recording paper conveyed by the recording paper conveying unit 104. The fixing apparatus 27 heats and applies pressure to the recording paper to fix the toner image on the recording paper. After that, the recording paper is further conveyed by the recording paper conveying unit 104 to the discharge tray 47 where the recording paper is discharged. The cleaning unit 26 removes and collects the residual toner from the surface of the photosensitive drum 21 after the development and transfer.

In the present embodiment, the transfer unit 25 includes a transfer belt 31, a drive roller 32, an idler roller 33, an electrically conductive elastic roller 34, and the like. The transfer belt 31 is tensioned by the rollers 32 to 34 and other rollers so that the belt can be moved in a rotating manner. The transfer belt 31 has a predetermined resistance value (e.g., $1\times10^9$ to $1\times10^{13}$ Ω/cm), and conveys the recording paper placed on its surface. The electrically conductive elastic roller 34 is pressed against the surface of the photosensitive drum 21 with the transfer belt 31 therebetween, and pushes the recording paper on the transfer belt 31 against the surface of the photosensitive drum 21. A transfer electric field having the polarity opposite to that of the electric charge of the toner image on the surface of the photosensitive drum 21 is applied to the electrically conductive elastic roller 34, and the toner image on the surface of the photosensitive drum 21 is transferred to the recording paper on the transfer belt 31 by this transfer electric field of opposite polarity. For example, when the toner image has a charge of negative (−) polarity, the polarity of the transfer electric field applied to the electrically conductive elastic roller 34 is positive (+).

The fixing apparatus 27 includes a heat roller 35 and a pressure roller 36. When the recording paper is conveyed to the contact area (also called a "nip area") between the heat roller 35 and the pressure roller 36, the unfixed toner image on the recording paper is heated, fused and pressed to fix the toner image on the recording paper while the recording paper is conveyed by the rollers 35 and 36.

The recording paper conveying unit 104 includes a plurality of pairs of conveying rollers 41, a pair of registration rollers 42*a*, a pair of pre-registration rollers 42*b*, a recording paper conveyance path 43, reverse conveyance paths 44*a* and 44*b*, a plurality of branch claws 45, a pair of discharge rollers 46, and the like that convey the recording paper.

In the recording paper conveyance path 43, recording paper received from the feeding unit 105 is conveyed until the leading edge of the recording paper reaches the registration rollers 42*a*. At this time, because the registration rollers 42*a* are stopped temporarily, the leading edge of the recording paper abuts against the registration rollers 42*a*, and thus the recording paper is curved. By the elastic force of the curved recording paper, the leading edge of the recording paper is brought parallel to the registration rollers 42a. After that, the registration rollers 42a start rotating to convey the recording paper to the transfer unit 25 of the print processing unit 103, and the recording paper is further conveyed to the discharge tray 47 by the discharge rollers 46.

The stopping and rotation of the registration rollers 42a is performed by switching on/off the clutch between the registration rollers 42a and a drive shaft, or by switching on/off a motor which is the driving source of the registration rollers 42a.

In the case of recording an image also on the other side of the recording paper, the branch claws 45 are selectively switched to guide the recording paper from the recording paper conveyance path 43 to the reverse conveyance path 44b. The conveyance of the recording paper is stopped temporarily, and the branch claws 45 are again selectively switched to guide the recording paper from the reverse conveyance path 44b to the reverse conveyance path 44a to turn over the recording paper, and then the recording paper is returned to the registration rollers 42a of the recording paper conveyance path 43 through the reverse conveyance path 44a.

The conveyance of recording paper as described above is called switchback conveyance, with which the recording paper is turned over, and at the same time, the leading edge and the trailing edge of the recording paper are also changed. Accordingly, when the recording paper is turned over and returned, the trailing edge of the recording paper abuts against the registration rollers 42a, and is brought parallel to the registration rollers 42a. The recording paper is conveyed, with its trailing edge forward, to the transfer unit 25 of the print processing unit 103 by the registration rollers 42a, and printing is carried out on the other side of the recording paper, the toner image on the other side of the recording paper is fixed by the fixing apparatus 27, and then the recording paper is conveyed to the discharge tray 47.

The recording paper conveyance path 43 and the reverse conveyance paths 44a and 44b are provided with sensors that detect the position of recording paper or the like at various locations, so that the position of the recording paper is detected by the sensors so as to detect a conveyance error or the like.

The feeding unit 105 includes a plurality of paper feed cassettes 48. The paper feed cassettes 48 are trays for storing recording papers of various sizes, and are provided in the lower portion of the printing apparatus 100. Each paper feed cassette 48 has a pickup roller 65 or the like that draws out the recording paper sheet by sheet, and sends the drawn sheets of recording paper to the recording paper conveyance path 43 of the recording paper conveying unit 104.

Because the printing apparatus 100 is intended to provide a high speed printing process, each paper feed cassette 48 is configured to have a capacity for holding 500 to 1500 sheets of recording paper of a standard size.

The discharge tray 47 is disposed on the side of the apparatus located on the left in FIG. 1. Instead of the discharge tray 47, an apparatus for post-processing (stapling, punching, etc.) the discharged recording paper, or a plurality of discharge trays can be disposed optionally.

In the printing apparatus 100 as described above, the printing speed is increased, improving the ease of use. For example, in the case of using recording paper of A4 size, the conveying speed of the recording paper is set to 100 sheets/min (processing speed: 450 to 600 mm/sec).

Figure 2:
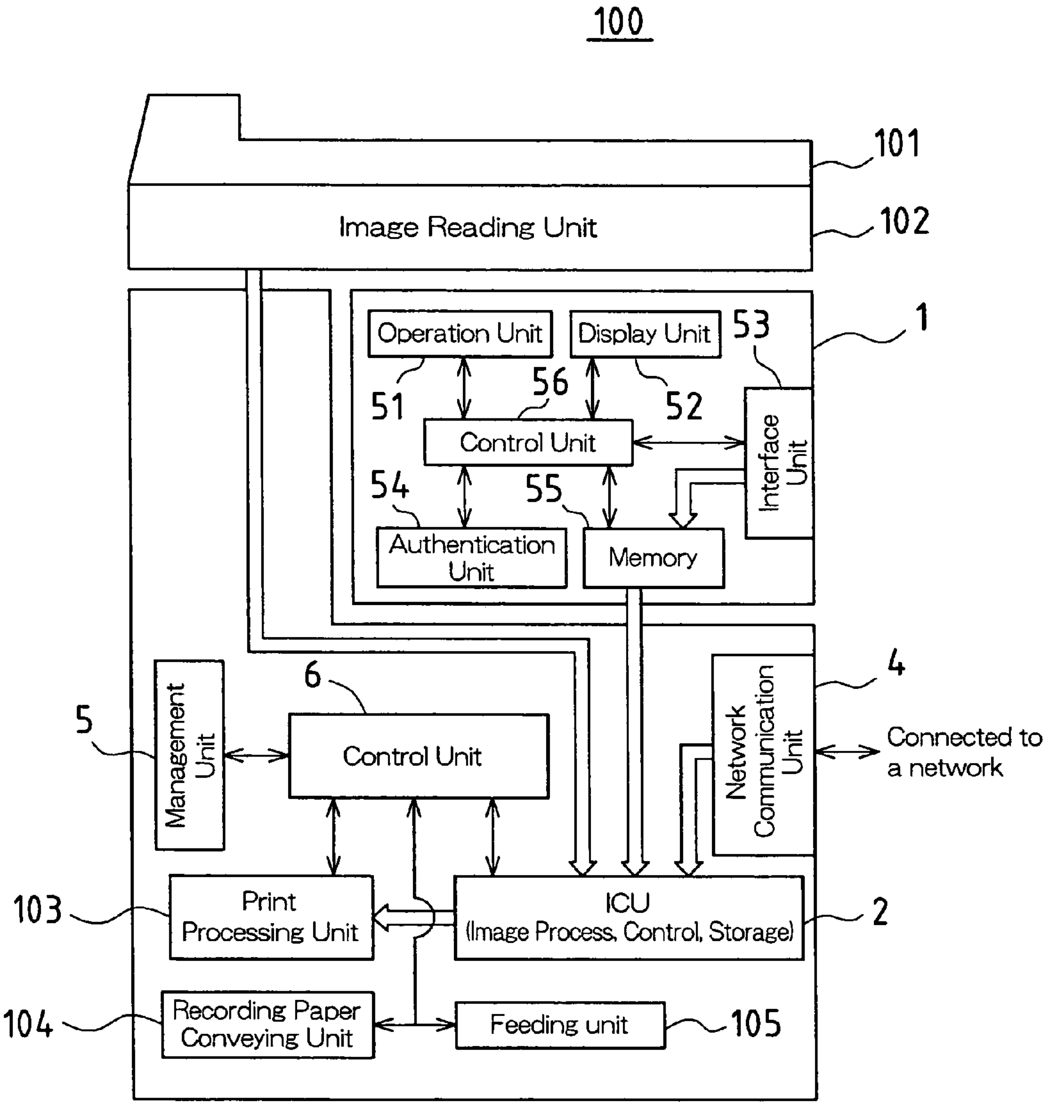
FIG. 2 is a block diagram that schematically shows the configuration of the printing apparatus of FIG. 1.

FIG. 2 is a block diagram that schematically shows a configuration of the printing apparatus 100 of FIG. 1. This printing apparatus 100 includes, as shown in FIG. 1, the document conveying unit 101, the image reading unit 102, the print processing unit 103, the recording paper conveying unit 104, and the feeding unit 105, and further includes an information processing unit 1, an image processing unit (ICU) 2 that edits, stores and outputs inputted image data, a network communication unit 4 that performs data communication via a network, a management unit 5 that stores and manages the control information, settings information and the like of the entire apparatus, and a control unit 6 that controls the entire apparatus.

The image processing unit 2 has a hard disk drive and a memory that store image data. The image processing unit 2 acquires image data from the image reading unit 102, or acquires image data received by the network communication unit 4 from an external source via a network, and stores the image data in the memory after performing an image process, or outputs image data read out from the memory to the print processing unit 103, or sends image data read out from the memory via the network communication unit 4.

The information processing unit 1 includes an operation unit 51 for input operation, a display unit 52 that displays operation screens, an interface unit 53 that performs communication with a portable terminal device such as a USB device or IC card, an authentication unit 54 that authenticates inputted authentication information, a memory 55 that stores information such as authentication information, and a control unit 56 that processes the inputted operation information and authentication information. The communication performed by the interface unit 53 is not limited to wired communication, and may be wireless communication.

The operation unit 51 and the display unit 52 are provided in an operation panel disposed on the front side of the upper surface of the printing apparatus 100. The operation unit 51 has various operation keys. The display unit 52 is a liquid crystal display screen with a touch panel superimposed on the screen, and displays various illustrations, data, display buttons, and the like. The screen of the display unit 52 displays an operation guide of the printing apparatus 100 or the like. The user operates the operation keys of the operation unit 51 or the display buttons of the liquid crystal display screen according to the guide to input instructions regarding copying, printing, scanning, and faxing. The inputs/instructions are inputted to the control unit 6 through the memory 55.

The control unit 6 controls the operation of the printing apparatus 100, and is a microcomputer and further includes: a ROM that stores control programs for performing a copy mode, a print mode, a scan mode, a fax mode, and the like; a RAM used as a working area; a nonvolatile memory that creates and stores a backup of the data necessary for control; input circuits including a buffer that receives an input of signals from sensors or switches, and an A/D converter circuit; and output circuits including drivers for driving loads such as motors, solenoids or lamps.

In order to execute the copy mode, an instruction to select the copy mode is entered by an input operation through an operation key of the operation unit 51 or a display button on the screen, printing conditions of a print job, such as the size of recording paper (selection of a paper feed cassette), single-sided/double-sided printing, the number of print copies and the print density, are inputted/instructed, and then the start button (which is one of the operation keys) is depressed. In response to the depression of the start button, a copy mode operation is started and executed by the control unit 6. Specifically, the original document is conveyed by the document conveying unit 101, and the original image of the original document is read out by the image reading unit 102, the image data is transmitted from the image reading unit 102 to the image processing unit 2 where an image process, such as color correction and density correction, is performed on the image data by the image processing unit 2, and the image data is rasterized. The rasterized image data is provided to the print processing unit 103 where the original image represented by the image data is recorded on recording paper by the print processing unit 103.

In order to execute the print mode, the printing conditions of a print job, such as the size of recording paper (selection of a paper feed cassette), single-sided/double-sided printing, the number of print copies and the print density, are written in a page description language such as PDL or the like using an external personal computer. The image data with the page description language is transmitted from the external computer to the printing apparatus 100 via a network. In the printing apparatus 100, the image data is received by the network communication unit 4, and then transmitted to the image processing unit 2 where the page description language of the image data is analyzed by the image processing unit 2, and the image data is rasterized. The rasterized image data is provided to the print processing unit 103 where the original image represented by the image data is recorded on recording paper by the print processing unit 103.

Further, in order to execute the scan mode, an instruction to select the scan mode is entered by an input operation through an operation key of the operation unit 51 or a display button on the screen, and then the start button (operation key) is depressed. In response to the depression of the start button, the original document is conveyed by the document conveying unit 101, and the image of the original document is read out by the image reading unit 102, the image data is transmitted from the image reading unit 102 to the image processing unit 2 where image processing is performed on the image data by the image processing unit 2, and the image data is stored in the memory.

Further, in order to cause the printing apparatus 100 to operate in the fax mode, an instruction to select the fax mode is entered by an input operation through an operation key of the operation unit 51 or a display button on the screen, and then the start button (operation key) is depressed. In response to the depression of the start button, the original document is conveyed by the document conveying unit 101, and the image of the original document is read out by the image reading unit 102, the image data is transmitted from the image reading unit 102 to the image processing unit 2 where image processing is performed on the image data by the image processing unit 2, and the image is transmitted from the image processing unit 2 to the network communication unit 4 where the image data is encoded and then sent by the network communication unit 4. Alternatively, if image data from an external source is received by the network communication unit 4, the image data is decoded, and a print job for printing the image data is generated. Then, the image data is transmitted from the network communication unit 4 to the image processing unit 2 where image processing is performed on the image data by the image processing unit 2, and the image data is rasterized. The rasterized image data is provided to the print processing unit 103 where the original image represented by the image data is recorded on recording paper by the print processing unit 103.

Next, the paper conveyance control of the recording paper conveying unit 104 performed by the control unit 6 will be described in detail.

The printing apparatus 100 has a plurality of paper feed cassettes 48, and recording paper of a desired size can be stocked in each paper feed cassette 48.

Figure 3:
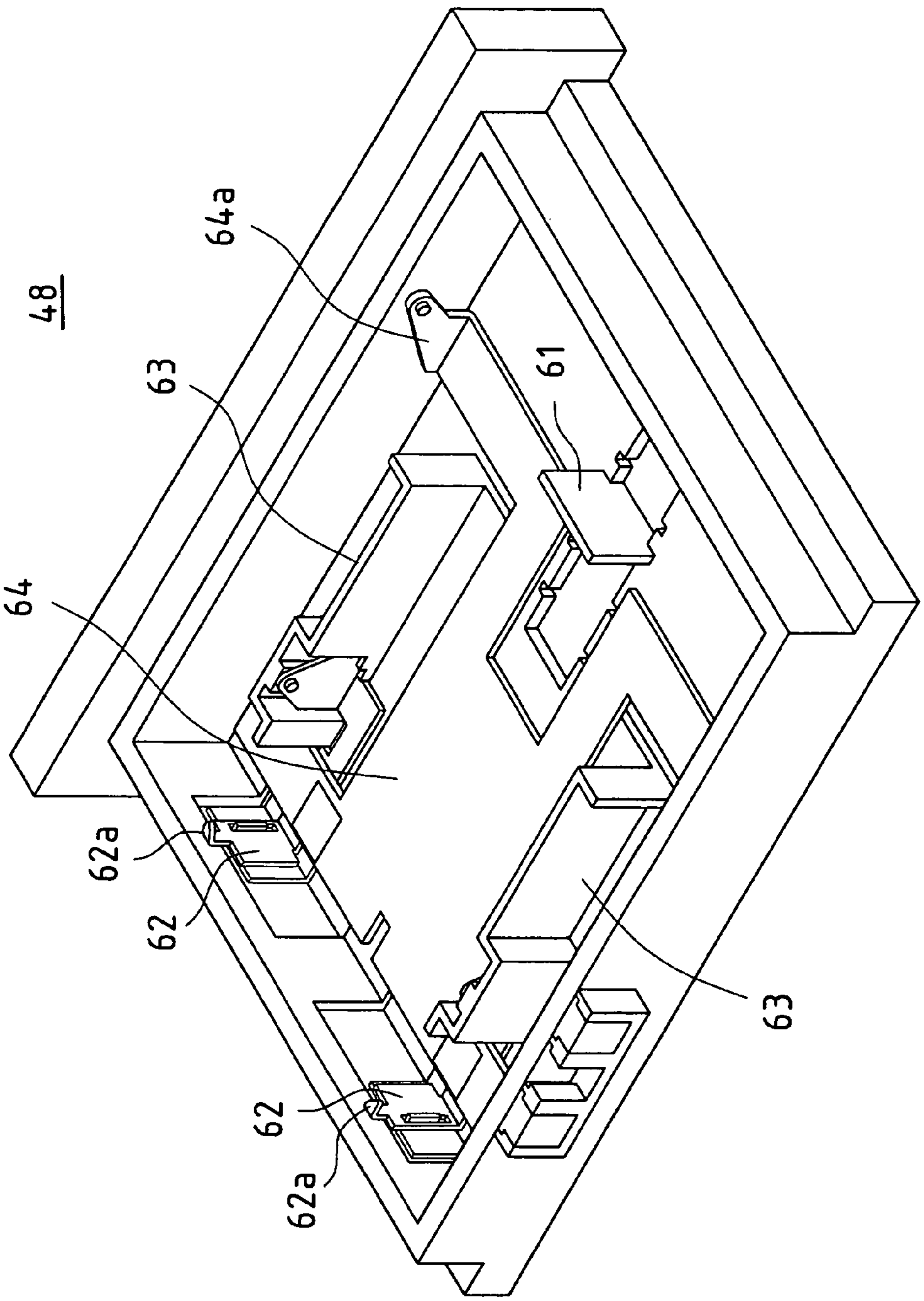
FIG. 3 is a perspective view of a paper feed cassette of the printing apparatus of FIG. 1.

In the paper feed cassette 48, as shown in FIG. 3, a trailing edge holding plate 61 abutting against the trailing edge of recording paper is provided in a projected manner on the rear side of the bottom of the paper feed cassette 48. In front of the trailing edge holding plate 61, leading edge alignment members 62 that hold the two corners at the leading edge of the recording paper are provided. On both inner sides of the cassette, side regulating plates 63 that align the two sides of the recording paper are provided. Further, a recording paper placement plate 64 is provided over the bottom of the paper feed cassette 48, and rear sides 64*a* of the recording paper placement plate 64 are pivoted at the two side walls of the paper feed cassette 48.

In this paper feed cassette 48, a plurality of sheets of recording paper are placed on the recording paper placement plate 64, in the inner space surrounded by the trailing edge holding plate 61, the leading edge alignment members 62 and the side regulating plates 63.

To allow the paper feed cassette 48 to hold recording papers of various sizes, the trailing edge holding plate 61 can be moved back and forth, and the leading edge alignment members 62 and the side regulating plates 63 can be moved in lateral direction. Under the recording paper placement plate 64, one leading edge alignment member 62 of the paper feed cassette 48 is connected to one side regulating plate 63 to form a pair, and the other leading edge alignment member 62 is connected to the other side regulating plate 63 to form a pair. Thus, a configuration is formed in which the leading edge alignment members 62 are moved in lateral direction in a symmetrical manner, and at the same time, the side regulating plates 63 also are moved side to side in a symmetrical manner, so as to prevent the center position of the recording paper from deviating from the center position of the paper feed cassette 48.

Upon placing recording paper on the recording paper placement plate 64, the recording paper placement plate 64 is rotated about the pivots of the rear sides 64*a* by a not shown mechanism, whereby the front end of the recording paper placement plate 64 is lifted, the corners of the leading edge of the recording paper abut against the claws 62*a* of the leading edge alignment members 62, and the leading edge of the recording paper is maintained at an appropriate height.

In this state, the pickup roller 65 (shown in FIG. 1) of the printing apparatus 100 is pressed against the surface of the uppermost sheet of the recording paper in the paper feed cassette 48, and is rotatively driven. This recording paper sheet is drawn in the rotating direction of the pickup roller 65 and conveyed to the recording paper conveyance path 43.

As described above, recording paper of a desired size is stocked in each paper feed cassette 48, and the recording paper is drawn from the paper feed cassette 48 by the pickup roller 65.

However, because recording paper of different sizes can be stocked in each paper feed cassette 48, it is necessary to identify which paper feed cassette 48 contains which size. To this end, the size of recording paper contained in each paper feed cassette 48 is inputted/instructed by an input operation through an operation key of the operation unit 51 or a display button on the screen and the sizes of the recording papers contained in the paper feed cassettes are stored 48 in the memory of the control unit 6.

In the copy mode, print mode or the like, the control unit 6 determines the size of recording paper according to the printing conditions of a print job, and selects the paper feed cassette 48 containing the recording paper of the determined size. Then, the control unit 6 controls the driving of the pick up roller 65 of the selected paper feed cassette 48 or the like, draws the recording paper from the paper feed cassette 48, and conveys and feeds the recording paper to the recording paper conveyance path 43. Further, the control unit 6 controls the driving of the conveying rollers 41, the registration rollers 42*a* and the pre-registration rollers 42*b* of the recording paper conveyance path 43 and the like to convey the recording paper.

On the other hand, in the copy mode, because the user is usually near the printing apparatus 100, in many cases, a paper conveyance control is performed such that the recording paper is discharged in a short time with the printed surface of the recording paper facing upward. This is called "face-up discharge".

In the print mode, because the user is not near the printing apparatus 100, in many cases, a paper conveyance control is made such that the recording paper is discharged with the printed surface of the recording paper facing downward, and piled in page order. This is called "face-down discharge".

It is also possible to perform double-sided printing on recording paper by turning over the recording paper as described previously.

Accordingly, double-sided printing on recording paper is performed by switching between the face-up discharge and the face-down discharge, or turning over the recording paper. The face-up discharge, the face-down discharge, and the double-sided printing on recording paper are performed, after recording paper has passed through the fixing apparatus 27, by selectively switching the branch claws 45 to deliver or retrieve recording paper to and from the recording paper conveyance path 43 and the reverse conveyance paths 44*a* and 44*b*.

Figure 4:
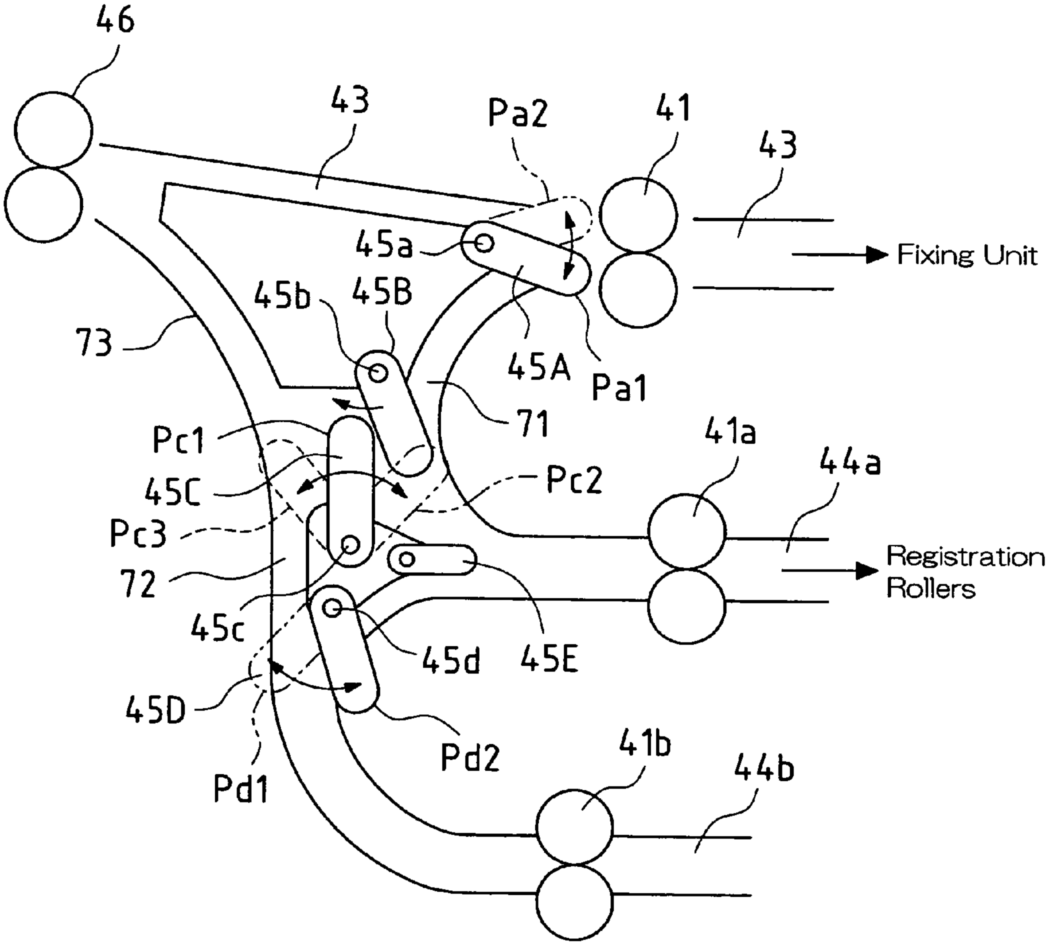
FIG. 4 is an enlarged view of a recording paper conveyance path, reverse conveyance paths and the like that are located downstream of the fixing apparatus of the printing apparatus of FIG. 1.

FIG. 4 is an enlarged view of the recording paper conveyance path 43, the reverse conveyance paths 44*a* and 44*b*, and the like that are located downstream of the fixing apparatus 27. Note that, in FIG. 4, reference numerals 45A to 45E are assigned to the branch claws 45 to distinguish each branch claw.

In FIG. 4, the branch claw 45A pivotally supported by its pivot 45*a* is rotated about the pivot 45*a*, and is positioned in either of two positions Pa1 and Pa2 shown by a solid line and a long-short-short dashed line, respectively. When the branch claw 45A is positioned in the position Pa1 shown by the solid line, the recording paper from the fixing apparatus 27 passes through the recording paper conveyance path 43 and through the discharge rollers 46, and is discharged to the discharge tray 47. When the branch claw 45A is positioned in the position Pa2 shown by the long-short-short dashed line, the recording paper is guided from the recording paper conveyance path 43 to the intermediate conveyance path 71.

The branch claw 45B is pivotally supported by its pivot 45*b*, and is elastically supported by a spring (not shown in the drawings). When the recording paper is guided from the recording paper conveyance path 43 to the intermediate conveyance path 71, and the leading edge of the recording paper hits the branch claw 45B, the branch claw 45B swings in the direction of the arrow due to the stiffness of the recording paper, and the recording paper passes the position of the branch claw 45B. Also, the branch claw 45B prevents the recording paper conveyed in the opposite direction from the reverse conveyance path 44*a* from entering the intermediate conveyance path 71.

The branch claw 45C, which is pivotally supported by its pivot 45*c*, is rotated about the pivot 45*c*, and is positioned in any one of three positions Pc1, Pc2, Pc3 shown by a solid line, a long-short-short dashed line and a dotted line, respectively. When the branch claw 45C is positioned in the position Pc1 shown by the solid line, the recording paper from the intermediate conveyance path 71 is guided to the reverse conveyance path 44*a*. When the branch claw 45C is positioned in the position Pc2 shown by the long-short-short dashed line, the recording paper from the intermediate conveyance path 71 is guided to the intermediate conveyance path 72. When the branch claw 45C is positioned in the position Pc3 shown by the dotted line, the recording paper conveyed in the opposite direction from the reverse conveyance path 44*a* is guided to the intermediate conveyance path 73.

The branch claw 45D, which is pivotally supported by its pivot 45*d*, is rotated about the pivot 45*d*, and is positioned in either of two positions Pd1, Pd2 shown by a long-short-short dashed line and a solid line, respectively. When the branch claw 45D is positioned in the position Pd2 shown by the solid line, the recording paper conveyed from the intermediate conveyance path 72 is guided to the reverse conveyance path 44*b*. When the branch claw 45D is positioned in the position Pd1 shown by the long-short-short dashed line, the recording paper conveyed in the opposite direction from the reverse conveyance path 44*b* is guided to the reverse conveyance path 44*a*.

The branch claw 45E is fixed. The switching operation of the branch claws 45A to 45D is performed by configuring the branch claws to be rotatable by a driving source such as a motor or solenoid, and letting the control unit 6 control the driving of the driving sources of the branch claws 45A to 45D.

By combining the switching operation of the branch claws 45A to 45D as described above with the forward and reverse driving operation of the conveyance path rollers 41*a* and 41*b* of the reverse conveyance paths 44*a* and 44*b* as appropriate, the face-up discharge, the face-down discharge and the operation of turning over the recording paper can be performed selectively.

For example, in the case of the face-up discharge, the branch claw 45A is positioned in the position Pa1 shown by the solid line by the control unit 6. In this state, the recording paper from the fixing apparatus 27 passes through the recording paper conveyance path 43 and through the discharge rollers 46, and is discharged to the discharge tray 47. Thereby, the recording paper is discharged to the discharge tray 47 with the printed surface facing upward.

In the case of the face-down discharge, firstly, the branch claw 45A is positioned in the position Pa2 shown by the long-short-short dashed line, and the branch claw 45C is positioned in the position Pc1 shown by the solid line by the control unit 6. In this state, the recording paper is guided from the recording paper conveyance path 43 through the intermediate conveyance path 71 to the reverse conveyance path 44*a*, and the recording paper is conveyed by the conveying rollers 41*a*. At this time, the printed surface of the recording paper is faced downward. Then, at the timing when the trailing edge of the recording paper reaches the branch claw 45E, the conveying rollers 41*a* are stopped and reversely driven by the control unit 6, and the branch claw 45C is positioned in the position Pc3 shown by the dotted line. Consequently, the recording paper is conveyed in the opposite direction from the reverse conveyance path 44*a*, guided to the intermediate conveyance path 73 and through the discharge rollers 46, and discharged to the discharge tray 47. Through this, the printed surface of the recording paper is faced downward, and the leading edge and the trailing edge of the recording paper are reversed, and after that, the recording paper is discharged to the discharge tray 47.

Further, in the case of the operation of turning over the recording paper, firstly, the branch claw 45A is positioned in the position Pa2 shown by the long-short-short dashed line, and the branch claw 45C is positioned in the position Pc3 shown by the dotted line, and the branch claw 45D is position in the position Pd2 shown by the solid line by the control unit

6. In this state, the recording paper is guided from the recording paper conveyance path 43 through the intermediate conveyance path 71 to the reverse conveyance path 44*b*, and the recording paper is conveyed by the conveying rollers 41*b*. At this time, the printed surface of the recording paper faces downward. And, at the timing when the trailing edge of the recording paper reaches the reverse conveyance path 44*b*, the conveying rollers 41*b* are stopped and reversely driven by the control unit 6, and the branch claw 45D is positioned in the position Pd1 shown by the long-short-short dashed line. Consequently, the recording paper is conveyed in the opposite direction from the reverse conveyance path 44*b* to the reverse conveyance path 44*a*. Subsequently, the recording paper is returned through the reverse conveyance path 44*a* to the registration rollers 42*a*, after which the recording paper is conveyed, with its trailing edge forward, to the transfer unit 25 of the print processing unit 103 where printing is carried out on the back of the recording paper, and the toner image on the back of the recording paper is fixed by the fixing apparatus 27, and then the recording paper is returned to the branch claw 45A. Further, the back side of the recording paper is faced upward, and discharged to the discharge tray 47 by the operation of face-up discharge described above, or the front side of the recording paper is faced upward, and discharged by the operation of face-down discharge described above.

FIG. 5 shows a table to illustrate differences in the discharge operation of recording paper by switching of the branch claws in an organized manner.

In the manner as described above, recording paper is drawn and conveyed from a paper feed cassette 48 by the control unit 6, and the face-up discharge, the face-down discharge, or the double-sided printing on the recording paper is selectively performed.

As mentioned earlier, because recording papers of desired sizes can be stocked in the paper feed cassettes 48, it is necessary to input/instruct the size of the recording paper loaded in each paper feed cassette 48 by an input operation through an operation key of the operation unit 51 or a display button on the screen.

However, a mistake may be made in inputting/instructing the paper size. For example, although recording paper of a standard size of A4 is loaded in a paper feed cassette 48, a standard size of A3 may be mistakenly inputted/instructed. Also, the A4 size used in Japan is different from the letter size or legal size used in the United States, but the difference is very slight. For this reason, the size may be misjudged, and the misjudged size may be inputted/instructed. For reference, A4 size is 210 mm×297 mm, letter size is 215.9 mm×279.4 mm, and legal size is 215.9 mm×355.6 mm.

If a size different from that of the recording paper contained in a paper feed cassette 48 is mistakenly inputted/instructed, because the paper feed cassette 48 is selected according to the size set by the printing conditions of a print job, the paper feed cassette 48 feeds recording paper having a size different from the size of the printing conditions, resulting in defective printouts.

Further, when the size of the recording paper supplied is different from that of the printing conditions, a conveyance failure or jam of the recording paper is likely to occur when the face-down discharge or the double-sided printing on the recording paper described above is performed. Once such an event occurs, the print job stops immediately, and the print job cannot be restored for a long time until that event is resolved. Particularly when a plurality of print jobs are queued, the printing of all the print jobs is delayed, and it is therefore impossible to achieve a high speed printing process.

For example, in the operation of face-down discharge, the operation is performed based on the size of printing conditions. If the recording paper is shorter than the size of printing conditions, the trailing edge of the recording paper passes through the branch claw 45E, and when the conveying rollers 41*a* are stopped and reversely driven, the recording paper is guided to the reverse conveyance path 44*b* rather than the intermediate conveyance path 73, which causes a conveyance failure or jam of recording paper. Conversely, if the recording paper is longer than the size of printing conditions, the trailing edge of the recording paper cannot pass through the branch claw 45B, and when the conveying rollers 41 are stopped and reversely driven, the recording paper is returned to the initial position, which causes a conveyance failure or jam of recording paper.

Or, sensors that detect the position of recording paper or the like are disposed at various locations in the recording paper conveyance path 43 and the reverse conveyance paths 44*a* and 44*b*, and a conveyance error or the like is detected by detecting the position of recording paper by the sensors, but if the size of recording paper is different from that of printing conditions, the timing when each sensor detects the leading edge or trailing edge of the recording paper deviates from the detection timing specified based on the size of printing conditions, this deviation is mistakenly determined as a conveyance error of recording paper, and the printing apparatus 100 stops.

As described above, when the size of recording paper is different from that of printing conditions, a print failure, or a conveyance failure or jam of recording paper occurs, or the printing apparatus 100 stops due to a misdetection of a conveyance error, and therefore an increased print job speed cannot be achieved.

To address this, according to the present embodiment, the size of the recording paper supplied is detected, and the detected size of the recording paper is compared with the size of recording paper set by the print conditions of the print job, and when the two sizes are different, the period of time until the recording paper is discharged to the discharge tray 47 is shortened to the minimum. For example, the conveyance path of the recording paper is shortened to the minimum. More specifically, the face-down discharge or the turning over of the recording paper is stopped, and only the face-up discharge and single-sided printing are performed. This causes the recording paper to pass through the recording paper conveyance path 43 and be discharged to the discharge tray 47, so the recording paper is not conveyed to the reverse conveyance paths 44*a* and 44*b* and the intermediate conveyance paths 71 to 73, a conveyance failure or jam of recording paper does not occur, so that it is possible to prevent the stopping of print jobs resulting from these causes.

The size of recording paper is detected based on the detection output of a recording paper detection sensor 74 located near the pre-registration rollers 42*b*. The detection output of the recording paper detection sensor 74 changes when the leading edge and trailing edge of the recording paper pass therethrough. Also, because the control unit 6 controls the conveying speed of the recording paper conveyed by the recording paper conveying unit 104 in accordance with the printing conditions of the print job, the conveying speed is already known. The control unit 6 measures the time from the timing when the leading edge of recording paper is detected to the timing when the trailing edge is detected based on the detection output of the recording paper detection sensor 74, and determines the length of the recording paper based on the measured time and the conveying speed. The control unit 6 then determines the standard size that corresponds to the length of the recording paper. For example, the lengths of various standard sizes are stored, the standard size having the length closest to the length of the recording paper determined by detection is selected, and the standard size for the recording paper is identified.

In the case of a print job, the control unit 6 compares the size of the first sheet of recording paper with the size of recording paper set by the print conditions of the print job. When the sizes are different, a single-sided printing process is performed on the first sheet of recording paper, and the face-up discharge is set to discharge the sheet in the shortest time. The reason why the printing process is performed is that, at the time when it is determined that the sizes are different, in other words, at the time immediately after the trailing edge of recording paper is detected by the recording paper detection sensor 74, the development of the latent image on the surface of the photosensitive drum 21 or the like has already been performed, so the transfer of the toner image on the surface of the photosensitive drum 21 and the fixing of the toner image on the surface of the recording paper are necessary.

Further, at the time when it is determined that the sizes are different, preliminary paper feeding has already been performed from the paper feed cassette 48, and the second and subsequent sheets of recording paper have already been drawn or are being drawn from the paper feed cassette 48. Because the preliminarily fed sheets of recording paper have the same size as that of the first sheet, the face-up discharge is set also for the preliminarily fed sheets of recording paper to discharge the sheets in the shortest time. As for at least the first sheet of the preliminarily fed recording paper, the development of the latent image on the surface of the photosensitive drum 21 or the like may have already been started or may not have started yet, so whether or not to perform the transfer of the toner image on the surface of the photosensitive drum 21 or the fixing of the toner image on the surface of the recording paper is determined.

Accordingly, when the size of the first sheet of recording paper is different from the size of recording paper set by the print conditions of a print job, for the first sheet of recording paper, a single-sided printing process is performed, and the face-up discharge is performed to discharge the sheet in the shortest time. As for the preliminarily fed recording paper, whether or not a single-sided printing process has already been started is checked, and only the single-sided printing process that has already been started is performed, and the face-up discharge is performed to discharge the paper in the shortest time.

With this configuration, it is possible to prevent the occurrence of a conveyance failure or jam of recording paper, as well as the stopping of print jobs resulting from these causes.

In the manner as described above, the recording paper having a size different from that set by the print conditions of a print job is discharged, and the print job is terminated forcibly in the shortest time so as to execute the next print job. Consequently, the next print job can be executed with little delay, so a plurality of print jobs that follow can be executed.

For example, in the case of a print job, when the size of the first sheet of recording paper and the size of recording paper set by the print conditions of a print job are different with the first sheet being letter size and the set recording paper size being A4, a single-sided printing process and face-up discharge are performed for the first sheet of recording paper. For the recording paper preliminary fed from the paper feed cassette 48, only the single-sided printing process that has already been started is performed, and this print job is terminated forcibly in the shortest time. Then, the next print job is started.

Further, when a print job is forcibly terminated, the control unit 6 displays that fact on the display unit 52. Consequently, the user can perform an appropriate process based on this indication such as discarding of the recording paper of this print job having been discharged, or a retry of this print job at a later time.

Note that, the number of sheets of recording paper that are preliminary fed from a paper feed cassette 48 is determined according to the conveying distance from the paper feed cassette 48 to the pre-registration rollers 42*b*. As the conveying distance increases, the number increases. Accordingly, as the conveying distance increases, the number of sheets of recording paper on which the face-up discharge is performed is increased.

Figure 6:
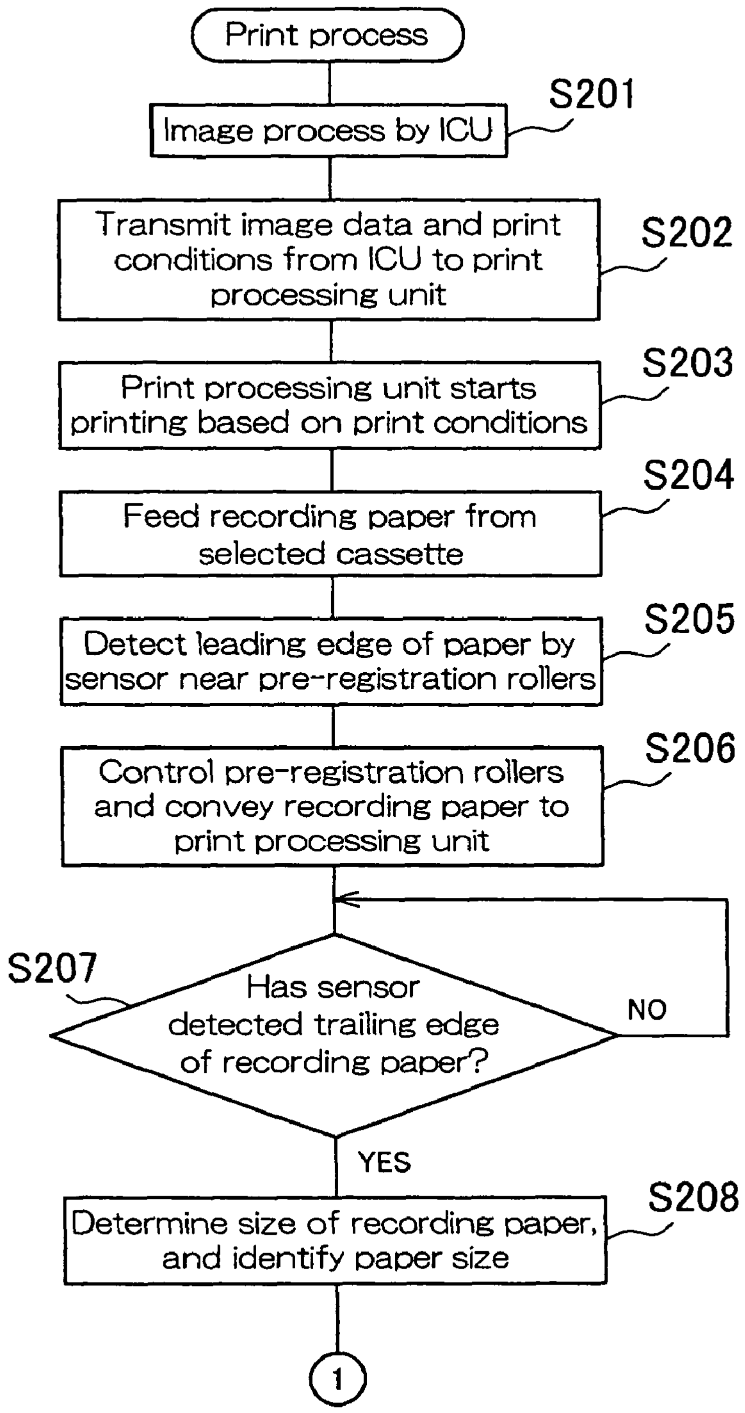
FIG. 6 is a flowchart that shows the control of discharging recording paper performed by the printing apparatus of FIG. 1.
Figure 7:
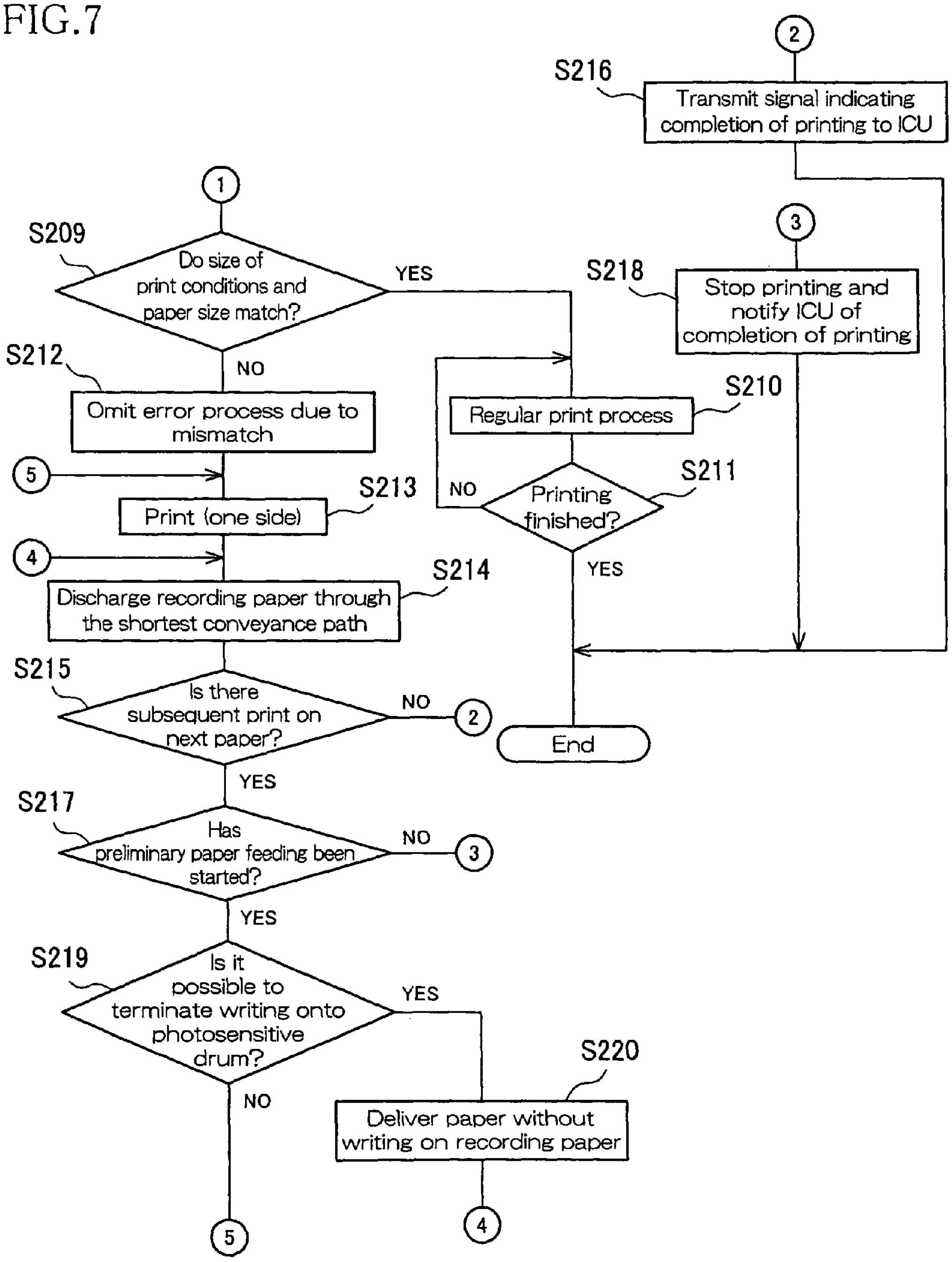
FIG. 7 is a flowchart that shows a process performed after the process of FIG. 6.

Next, the control of discharging such recording paper will be described in an organized manner with reference to the flowcharts of FIGS. 6 and 7.

Firstly, when a print job is generated while in the copy mode, print mode or the like, image data is rasterized by the image processing unit 2 (step S201), this image data is transmitted from the image processing unit 2 to the print processing unit 103 together with the print conditions (step S202), and a printing process, that is, the formation of an electrostatic latent image on the surface of the photosensitive drum 21 and the development of the electrostatic latent image, are started by the print processing unit 103 (step S203). At the same time, the paper feed cassette 48 containing the recording paper of the size set by the print conditions is selected from the paper feed cassettes 48 of the feeding unit 105, and the first sheet of the recording paper is fed from the selected paper feed cassette 48 (step S204).

When paper feeding is started as described above, the control unit 6 monitors the detection output of the recording paper detection sensor 74, and determines the timing when the leading edge of the recording paper is detected (step S205). After the leading edge of the recording paper abuts against the registration rollers 42*a* and is brought parallel to the registration rollers 42*a*, the registration rollers 42*a* are started to rotate, and the recording paper is conveyed to the print processing unit 103 (step S206). Then, the control unit 6 monitors the detection output of the recording paper detection sensor 74, waits for the timing when the trailing edge of the first sheet of the recording paper is detected (step S207), determines the timing when the trailing edge of the recording paper is detected (Yes in step S207), determines the time length from the timing when the leading edge of the first sheet of the recording paper is detected to the timing when the trailing edge thereof is detected, and the length of the recording paper based on the conveying speed, and determines the size that corresponds to the length of the recording paper (step S208). Further, the control unit 6 determines whether or not the determined size of the first sheet of the recording paper matches the size of recording paper set by the print conditions (step S209).

If the size of the first sheet of the recording paper matches the size of the print conditions (Yes in step S209), the control unit 6 performs a regular printing process according to the print conditions such as single-sided printing/double-sided printing, the number of print copies, print density (step S210). After the print job is completed (Yes in step S211), the control unit 6 returns to the state of waiting for the next print job.

In this case, the print job has been completed properly, so that the next print job is executed promptly.

If the size of the first sheet of the recording paper does not match the size of the print conditions (No in step S209), the control unit 6 performs, without terminating the print job (step S212), a single-sided printing process on the first sheet of the recording paper, and sets the face-up discharge to discharge the sheet in the shortest time (steps S213 and S214).

Subsequently, the control unit 6 determines whether or not there is subsequent printing on the second and subsequent sheets of the recording paper based on the print conditions (the number of print sheets or the number of print copies) (step S215). If there is no subsequent printing on the second and subsequent sheets of the recording paper (No in step S215), the control unit 6 terminates the print job immediately, outputs a signal that indicates the completion of printing to the image processing unit 2 (step S216), and returns to the state of waiting for the next print job.

In this case, although the print job is terminated forcibly, a signal indicating the completion of printing is outputted to the image processing unit 2, so that image data, print conditions and the like are transmitted from the image processing unit 2 to the print processing unit 103, and the next print job is executed immediately.

If there is subsequent printing on the second and subsequent sheets of the recording paper (Yes in step S215), the control unit 6 determines whether or not there are second and subsequent sheets of the recording paper that have already been drawn or are being drawn from the paper feed cassette 48, in other words, whether or not there is paper preliminary fed from the paper feed cassette 48 (step S217). If there is no second and subsequent sheets of the recording paper that are preliminary fed (No in step S217), the control unit 6 terminates the print job immediately, outputs a signal that indicates the completion of printing to the image processing unit 2 (step S218), and returns to the state of waiting for the next print job.

In this case also, the print job is terminated forcibly, but because the signal indicating the completion of printing is outputted to the image processing unit 2, the next print job is executed immediately.

If there is the second and subsequent sheets of the recording paper that are preliminary fed from the paper feed cassette 48 (Yes in step S217), steps S219 and S220 are performed for these sheets, and the feeding of additional sheets of the recording paper from the paper feed cassette 48 is stopped.

Specifically, the control unit 6 determines whether or not the printing process of the print processing unit 103, such as the formation of an electrostatic latent image on the surface of the photosensitive drum 21 and the development of the electrostatic latent image, has been started for each of the second and subsequent sheets of recording paper (step S219). If the printing process has been started (No in step S219), the process returns to steps S213 and S214 where a single-sided printing process is performed, and the face-up discharge is set to discharge the sheet in the shortest time. Because the recording paper is discharged after the toner image on the surface of the photosensitive drum 21 is transferred to the recording paper. A large amount of unnecessary toner does not remain on the surface of the photosensitive drum 21.

If the printing process of the print processing unit 103 has not been started (Yes in step S219), without performing the printing process on the recording paper (step S220), the process returns to step S214, and the face-up discharge is set to discharge the recording paper in the shortest time.

Accordingly, the second and subsequent sheets of recording paper that are preliminary fed from the paper feed cassette 48 are discharged face-up after a single-sided printing process is performed, or are discharged face-up without a printing process. After that, a signal that indicates the completion of printing is outputted to the image processing unit 2, and the next print job is executed immediately.

As describe above, according to the present embodiment, when the size of recording paper does not match the size of print conditions, the recording paper is discharged in the shortest time, making it unlikely for a conveyance failure or jam of recording paper to occur, and preventing the stopping of print jobs resulting from these causes. Further, because a signal that indicates the completion of printing is outputted from the control unit 6 to the image processing unit 2 after the recording paper is discharged in the shortest time, it is possible to immediately transmit the next print job from the image processing unit 2 to the print processing unit 103, which allows a plurality of print jobs to be processed continuously without interruption. Accordingly, a continuous high speed printing process can be maintained.

It should be understood that the present invention is not limited to the embodiment given above, and can be modified in various ways. For example, it is also possible that, in a print job that prints a plurality of sheets of recording paper, when not only the size of the first sheet, but also that of the second and subsequent sheets of recording paper does not match the size of recording paper set by the print conditions, the second and subsequent sheets of recording paper and the recording paper that are preliminary fed are discharged in the shortest time, and a signal that indicates the completion of printing is outputted from the control unit 6 to the image processing unit 2.

Further, in the print job, when the size of recording paper does not match the size of the print conditions, not only the recording paper that are preliminary fed, but also all the sheets of recording paper whose number has been set by the print conditions of the print job may be discharged in the shortest time. In this case also, it is possible to execute the next print job without being held for a long time, achieving a high speed printing process.

Further, when the length of recording paper determined based on the detection output of the recording paper detection sensor 74 and the conveying speed is longer than the size of recording paper set by a print job, the timing of feeding the next sheet of the recording paper from the paper feed cassette 48 may be delayed, or the feeding of the next sheet of the recording paper from the paper feed cassette 48 may be started after the detection of the trailing edge of the recording paper by the recording paper detection sensor 74 has been confirmed. Because the conveyance interval of recording paper is set and controlled based on the size of recording paper set by a print job, if the length of recording paper is longer than that of recording paper set by the print job, the actual conveyance interval of recording paper is shortened. To address this, the timing of feeding the next sheet of recording paper may be delayed, or the feeding of the next sheet of recording paper from the paper feed cassette 48 may be started after the detection of the trailing edge of recording paper has been confirmed, so as to prevent the actual conveyance interval of recording paper from shortening. This prevents the sheets of recording paper from overlapping, or eliminates a jam of recording paper.

The present invention can be embodied and practiced in other different forms without departing from the gist and essential characteristics thereof. Therefore, the above-described embodiments are considered in all respects as illustrative and not restrictive. The scope of the invention is indicated by the appended claims rather than by the foregoing description. All variations and modifications falling within the scope of the appended claims are intended to be embraced therein.

What is claimed is:

1. A printing apparatus that comprises a printing means for executing a print job and performing a printing process on recording paper, and a control means for controlling the printing means, the printing apparatus causing the printing means to execute a plurality of print jobs sequentially, wherein the printing apparatus further comprises a recording paper detection means for detecting a size of recording paper fed to the printing means, and when a size of recording paper detected by the recording paper detection means is different from a size of recording paper set by a print job that is being executed by the printing means, the control means performs control such that a period of time until the recording paper is discharged is shortened to the minimum.

2. The printing apparatus according to claim 1, wherein the printing means outputs a signal that indicates completion of the print job after the recording paper is discharged, and in response thereto receives and executes a next print job.

3. The printing apparatus according to claim 1, wherein when a length of recording paper detected by the recording paper detection means is longer than a length of recording paper set by a print job that is being executed by the printing means, the control means delays a timing of feeding the next recording paper to the printing means.

4. The printing apparatus according to claim 1, wherein when a length of recording paper detected by the recording paper detection means is longer than a length of recording paper set by a print job that is being executed by the printing means, the control means starts feeding the next recording paper to the printing means after a trailing edge of recording paper is detected by the recording paper detection means.

5. The printing apparatus according to claim 1, wherein when a size of recording paper detected by the recording paper detection means is different from a size of recording paper set by a print job that is being executed by the printing means, the control means prohibits a double-sided printing process on the recording paper and causes the printing means to perform a single-sided printing process.

6. The printing apparatus according to claim 1, wherein when a size of recording paper detected by the recording paper detection means is different from a size of recording paper set by a print job that is being executed by the printing means, the control means prohibits an operation of turning over the recording paper performed by the printing means.

7. The printing apparatus according to claim 1, wherein recording paper that is being conveyed along a conveyance path from a position of feeding recording paper to the recording paper detection means is discharged in the shortest time.

8. The printing apparatus according to claim 1, wherein recording paper that is being conveyed along a conveyance path from a position of feeding recording paper to the recording paper detection means is discharged in the shortest time, and is not subjected to print processing.

9. The printing apparatus according to claim 1, wherein a number of sheets of recording paper that are discharged in the shortest time is set according to a conveying distance from a position where recording paper is fed to the recording paper detection means.

10. The printing apparatus according to claim 1, wherein the control means issues a message that the period of time until the recording paper is discharged is shortened to the minimum.

11. A method for controlling a printing apparatus that comprises a printing means for executing a print job and performing a printing process on recording paper, and that causes the printing means to execute a plurality of print jobs sequentially, the method comprising the steps of detecting a size of recording paper fed to the printing means; and when the detected size of recording paper is different from a size of recording paper set by a print job that is being executed by the printing means, performing control such that a period of time until the recording paper is discharged is shortened to the minimum.

12. The method for controlling a printing apparatus according to claim 11, wherein the printing means outputs a signal that indicates completion of the print job after the recording paper is discharged, and in response thereto receives and executes a next print job.

* * * * *